April 10, 1934.                    R. K. JEFFREY                    1,954,049
TOOL HOLDER
Original Filed Sept. 24, 1930

INVENTOR:
Robert K. Jeffrey
BY
Cushman, Bryant Darby Cushman
ATT'YS

Patented Apr. 10, 1934

1,954,049

UNITED STATES PATENT OFFICE 1,954,049

TOOL HOLDER

Robert K. Jeffrey, Columbus, Ohio, assignor to The Jeffrey Manufacturing Company, a corporation of Ohio Original application September 24, 1930, Serial No. 484,190. Divided and this application March 19, 1932, Serial No. 599,965

4 Claims. (Cl. 279—79)

My invention relates to tool holders of the type adapted to receive and hold in working position, augers for drilling in coal veins adapted to receive blasting charges.

Another object of the invention, is the provision of improved and efficient mechanism for releasably locking an operating shaft to a tool holder.

Other objects of the invention will appear hereinafter, the novel features and combinations being set forth in the claims hereto appended.

The present application is a division of my copending application, Serial Number 484,190, filed September 24, 1930, for an Improvement in drill mechanism.

An illustrative embodiment of the invention is shown in the accompanying drawing, in which.

Figure 1:
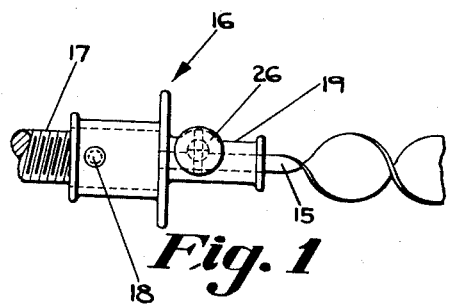
Fig. 1 is an elevational view of a tool holder embodying my invention.

By referring to Fig. 1, it will be seen that the auger, or drilling bit 15, is detachably held by socket 16 fixed to the end of a feed screw 17, which is operatively connected to power transmission mechanism.

The socket 16 may be connected to the feed screw 17 permanently, by means of the rivets 18, so that such socket will rotate at all times with the feed screw 17.

The drill socket proper, designated 19, is provided with a rectangular recess, or opening 20, extending axially of the feed screw 17 and being adapted to receive the flat shank 21 of the drill 15.

Figure 2:
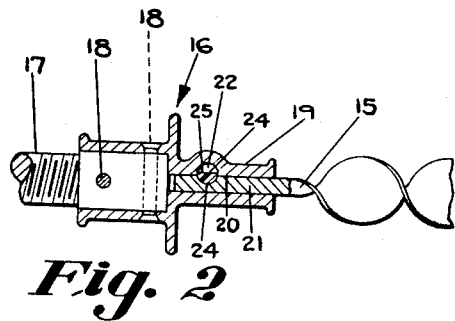
Fig. 2 is a sectional elevation of the interior construction of the tool holder shown in Fig. 1.

Extending transversely through the socket 19 is a semi-circular recess 22, which is adapted to register with a transverse semi-circular or semi-cylindrical recess 24, in the flat shank 21, as shown in Fig. 2.

Figure 3:
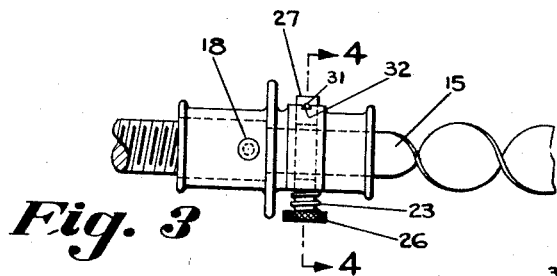
Fig. 3 is a plan view of the structure shown in Fig. 1.
Figure 4:
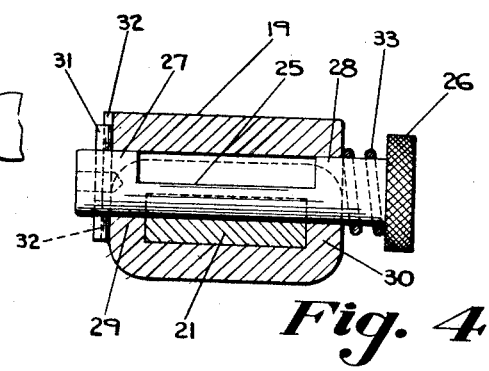
Fig. 4 is a cross-sectional view taken on the line 4—4 of Fig. 3, looking in the direction of the arrows.

Extending into the semi-cylindrical recesses 22, 24, is a transverse rotatable key 25, which is operatively connected to the knob 26, as shown in Figs. 1, 3 and 4.

As shown in Fig. 4, the key 25 may be provided at its ends with cylindrical extensions 27 and 28, journaled in bearings 29, 30 of the socket 19.

A cross pin 31, extending through the cylindrical member 27, is adapted to fit in recesses 32, 32, at one side of the socket 19.

At the other side of the socket 19, a spring 33 is interposed between the knob 26 and the socket 19. By pressing the knob 26 against the socket 19, the pin 31 may be released to permit turning of the key 25 from its locking position, shown in Figs. 2 and 4, to its unlocking position, to permit withdrawal of the tool shank 21. When a new tool is inserted into the socket 19, it may be locked in position when the transverse recess 24 in the shank thereof, registers with the transverse recess 22. Then the knob 26 may be turned to place the key 25 in the recess 24. The spring 33 holds the pin 31 in the recess 32 during operation of the drill.

Figure 5:
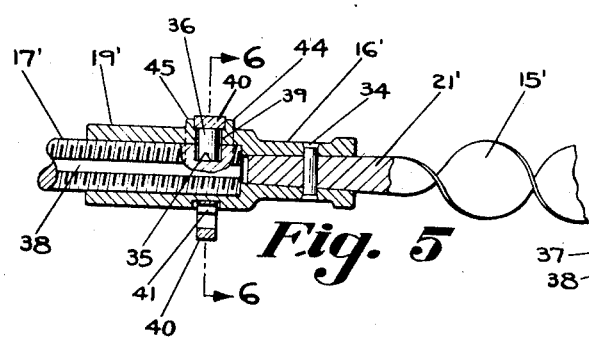
Fig. 5 is a sectional elevational view of a modification.

In the modification shown in Fig. 5, the drill 15' is provided with a tapering flat-sided shank 21', which may be secured permanently by means of the rivet 34 to the drill socket 16'.

Figure 6:
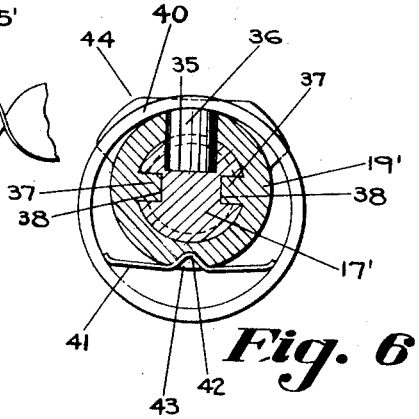
Fig. 6 is a sectional view taken on the line 6—6, Fig. 5, looking in the direction of the arrows.

The feed screw 17' is detachably connected to the socket 19' by means of the structure shown in Figs. 5 and 6. Near the end of the feed screw 17', at one side thereof, is located a cylindrical recess 35 for receiving the cylindrical locking pin 36, which extends through an opening in the wall of the socket 19'.

As shown in Fig. 6, the socket 19' is provided with longitudinal splines 37, 37, which may be integral with the socket 19'. The splines 37, 37, are adapted to fit into grooves 38, 38, which extend longitudinally of the feed screw 17' diametrically opposite each other. It will thus be seen that when the recess 35 in the feed screw 17' registers with the opening in the wall of the socket 19', the pin 36 may be inserted into the recess 35 to lock the tool holder against longitudinal movement away from the feed screw 17'. While the pin 36 fitting into the recess 35 may, in some instances, be sufficient to connect the tool holder to the feed screw for the purpose of imparting rotary movement from the feed screw to the tool holder, I prefer to reenforce such connection by means of the longitudinal splines 37, 37, fitting into the longitudinal grooves 38, 38, in the feed screw 17'. Furthermore, by providing splines to fit into such grooves, the registration of the recess 35 with the opening 39 in the socket 19', may be more quickly effected.

Rigidly secured to the pin 36 is the ring 40 against the inner surface of which, bears a spring 41. Intermediate the ends of the spring 41 is an elbow 42 adapted to fit into a recess 43 in that side of the socket 19' diametrically opposite the pin 36. It can readily be seen by referring to Fig. 6, that the spring 41 acts to hold the pin 36 in the recess 35, but by pressing the ring 40 upwardly, the pin 36 may be released from the recess 35, so that the socket 19' may be pulled off the feed screw 17'.

Lugs 44 and 45 may be provided on the socket 19', as shown in Figs. 5 and 6, to receive the ring 40 between them and thus prevent longitudinal movement of the ring. By the use of the lugs 44 and 45, the pin 36 may be formed separately from the ring. In other words, the pin 36 need not be secured to the ring 40, when the lugs 44 and 45 are provided to hold the ring 40 against longitudinal movement relatively of the socket 19'. Consequently, if repeated operations of the drill, by reason of the thrust action on the pin 36, wear out this pin, it may be renewed without renewing the ring 40.

Obviously, those skilled in the art, may make various changes in the details and arrangement of parts, without departing from the spirit and scope of the invention, as defined by the claims hereto appended, and I wish, therefore, not to be restricted to the precise construction herein disclosed.

Having thus shown and described an embodiment of my invention, what I desire to have protected by Letters Patent of the United States is:

1. In apparatus of the class described, the combination with a longitudinally displaceable shaft, of an auger supporting member having a socket portion adapted to receive one end of said shaft, said shaft having a recess in registry with an aperture in the wall of said socket portion, a loop-shaped member loosely surrounding the socket portion, a pin fixed to said loop-shaped member and engageable in said recess, and spring means interposed between the socket portion and the loop-shaped member opposite the pin and substantially within said loop-shaped member whereby the latter is yieldingly retainable in said recess, forced yielding of the spring permitting disengagement of the pin from the recess.

2. In apparatus of the class described, the combination with a longitudinally displaceable shaft, of an auger supporting member having a socket portion adapted to receive one end of said shaft, said shaft having a recess in registry with an aperture in the wall of said socket portion, a loop-shaped member loosely surrounding the socket portion, a pin fixed to said loop-shaped member and engageable in said recess, and spring means interposed between the socket portion and the loop-shaped member opposite the pin whereby the latter is yieldingly retainable in said recess, the spring means being in the form of a leaf spring disposed as a chord of said loop-shaped member, forced yielding of the spring permitting disengagement of the pin from the recess.

3. In apparatus of the class described, the combination with a longitudinally displaceable shaft, of an auger supporting member having a socket portion adapted to receive one end of said shaft, said shaft having a recess in registry with an aperture in the wall of said socket portion, a loop-shaped member loosely surrounding the socket portion, a pin fixed to said loop-shaped member and engageable in said recess, and spring means interposed between the socket portion and the loop-shaped member opposite the pin whereby the latter is yieldingly retainable in said recess, the spring means being in the form of a leaf spring disposed as a chord of said loop-shaped member and having a central portion projecting into a recess in said socket portion, forced yielding of the spring permitting disengagement of the pin from the recess.

4. A torque and thrust transmitting means for connecting a tool to the end of a reciprocable threaded and longitudinally grooved feed shaft of a drill, said means having a cylindrical socket of a size to receive slidingly a substantial length of the shaft end and provided with an internal spline for engagement with the shaft groove for the transmission of torque, the socket having an end wall against which the extremity of the shaft abuts for the transmission of feeding thrust, and releasable latch means carried by said connecting means and adapted to engage the shaft end for the transmission of withdrawal thrust.

ROBERT K. JEFFREY.